US006805358B2

(12) United States Patent
Dawson et al.

(10) Patent No.: US 6,805,358 B2
(45) Date of Patent: Oct. 19, 2004

(54) MAGNETIC SEAL

(75) Inventors: Stephen M. Dawson, Baton Rouge, LA (US); Gary D. Anderson, Prairieville, LA (US); Michael L. Deweese, Baton Rouge, LA (US)

(73) Assignee: Isomag Corporation, Baton Rouge, LA (US)

( * ) Notice: Subject to any disclaimer, the term of this patent is extended or adjusted under 35 U.S.C. 154(b) by 0 days.

(21) Appl. No.: 09/931,370

(22) Filed: Aug. 16, 2001

(65) Prior Publication Data

US 2003/0042684 A1 Mar. 6, 2003

(51) Int. Cl.$^7$ .............................................. F16J 15/447
(52) U.S. Cl. ...................... 277/421; 277/347; 277/378
(58) Field of Search ............................... 277/346, 347, 277/348, 370, 378, 411, 412

(56) References Cited

U.S. PATENT DOCUMENTS

| 2,883,212 | A |   | 4/1959  | Laser ........................... 286/10 |
|-----------|---|---|---------|------------------------------------------|
| 2,913,289 | A |   | 11/1959 | Stevenson ................ 308/187.1      |
| 3,050,319 | A |   | 8/1962  | Colby .......................... 277/41   |
| 3,080,170 | A |   | 3/1963  | Colby .......................... 277/93   |
| 3,755,870 | A | * | 9/1973  | Young et al. ................ 277/420     |
| 3,947,944 | A | * | 4/1976  | Washington ................. 277/370      |
| 4,795,168 | A |   | 1/1989  | Adams et al. ................ 277/80      |
| 4,890,941 | A | * | 1/1990  | Calafell et al. ............. 277/347     |
| 4,989,883 | A |   | 2/1991  | Orlowski ...................... 277/25    |
| 5,026,252 | A | * | 6/1991  | Hoffelner ................. 415/174.2     |
| 5,078,411 | A |   | 1/1992  | Geco .............................. 277/80 |
| 5,093,957 | A | * | 3/1992  | Do ................................ 16/2.1 |
| 5,158,304 | A |   | 10/1992 | Orlowski ...................... 277/53    |
| 5,161,804 | A | * | 11/1992 | Orlowski et al. ........... 277/378       |
| 5,174,583 | A | * | 12/1992 | Orlowski et al. ........... 277/421       |
| 5,181,728 | A | * | 1/1993  | Stec ............................ 277/355  |
| 5,409,240 | A |   | 4/1995  | Ballard ........................ 277/38   |
| 5,498,006 | A | * | 3/1996  | Orlowski ..................... 277/419    |
| 5,522,601 | A |   | 6/1996  | Murphy ........................ 277/53    |
| 5,538,029 | A | * | 7/1996  | Holtgraver ............... 137/15.17      |
| 5,730,447 | A |   | 3/1998  | Dawson et al. ............. 277/378       |
| 5,967,524 | A | * | 10/1999 | Fedorovich .................. 277/351     |
| 5,975,536 | A | * | 11/1999 | Helgeland .................... 277/410    |
| 6,029,978 | A | * | 2/2000  | Pelstring et al. ............ 277/409     |
| 6,182,972 | B1 | * | 2/2001 | Orlowski ..................... 277/350    |
| 6,485,022 | B1 | * | 11/2002| Fedorovich ................. 277/303      |

FOREIGN PATENT DOCUMENTS

JP              401316568 A   * 12/1989

* cited by examiner

Primary Examiner—J. J. Swann
Assistant Examiner—Thomas Ho
(74) Attorney, Agent, or Firm—Warner J. Delaune

(57) ABSTRACT

The invention herein is a seal to seal a rotating shaft to housing. The seal has a stator and a rotor, magnetically and mechanically coupled. The mechanical couple is provided through an interlocking annular groove provided on one component and a flange face on the other component. The mechanical couple allows the two components to become interconnected once a predetermined range of free movement of the rotor is exceeded. The stator and rotor are also mechanically coupled through a plurality of magnets positioned on either the stator or rotor. After the predetermined range is exceeded, the rotor slips along the shaft while the stator remains fixed, maintaining a seal in during axial movement of the rotating shaft.

13 Claims, 3 Drawing Sheets

MAGNETIC SEAL

FIELD OF INVENTION

This invention relates to magnetic seals for rotating shafts, and in particular, magnetic seals that allow for axial shaft movement.

BACKGROUND OF THE INVENTION

Magnetic seals have proven reliable for use on rotary shafts. Magnetic seals have a stationary ring, referred to herein as a stator, and a rotating ring, referred herein as a rotor. The stator is generally fixed to the shaft housing and does not rotate with the shaft. The rotor generally rotates with the shaft. The stator and rotor touch through contact faces, which provides the seal between the stator and rotor. Obviously, the contact faces are subject to frictional forces.

Various means are employed to maintain the seal between the contact faces. Magnetic means are one method utilized to keep the stator and rotor contact faces in contact through the attractive forces of permanent magnets. The magnets can be positioned on either the stator or rotor, with the magnets interacting with ferrous materials in the opposite component. The features of magnetic seals are shown in U.S. Pat. No. 5,078,411 to Adams, hereby incorporated by reference. As is shown in Adams, the magnets can be positioned on either the stator (FIG. 7) or rotor (FIG. 4).

An improved magnetic seal is shown in U.S. Pat. No. 5,730,447 to Dawson. This patent discloses a "floating" inner annulus on the stator, which helps keep the contact faces in contact in the presence of shaft tilt or shaft misalignment. However, prior art magnetic seals have failed to address the issue of maintaining the proper relationship between contact faces in the presence of axial shaft movement. For instance, in either Adams or Dawson, a two component stator/rotor design is utilized which, when axial shaft movement occurs, may result in seal loss as the stator and rotor become separated.

Another problem with two component magnetic seals is the potential for the contact faces to become damaged. To effect a seal, the contact faces are lapped flat to high tolerances, such as 0.00001–0.00005 inches. In assembly, it is possible for the installer to scratch, nick or otherwise damage the contact faces. This can readily occur as the installer has access to both faces.

A final problem with magnetic seals is that some components of the seals may be joined to the rotating shaft with elastomeric O-rings. Over time, these rings can be exposed to heat and other stresses, and the rings may adhere or become semi-bonded to the shaft, preventing problems during periods of axial shaft movement.

SUMMARY OF THE INVENTION

It is therefore an object of this invention to provide a magnetic rotary seal, which allows unlimited axial shaft movement in either direction without seal removal.

It is an object of this invention to provide a single unit stator/rotor magnetic seal.

It is an object of this invention to provide an single unit stator/rotor magnetic seal easily installable, without the need for sleeves, drive collars, or other devices to set the seal into the shaft housing.

It is an object of the invention to provide a magnet seal where the contact faces are protected during installation.

It is also an object of this invention to protect the contact faces for exposure to contaminants during the operation and stand by modes of the machines it is installed on.

It is another object of the invention to free struck rotor O rings during periods of axial shaft movement.

The invention herein is a stator and a rotor, magnetically and mechanically coupled. The mechanical couple is provided through an interlocking annular groove provided on one component and a flange face on the other component. The mechanical couple allows the two components to become interconnected once a predetermined range of free movement of the rotor is exceeded. After the predetermined range is exceeded, the rotor slips along the shaft while the stator remains fixed.

DETAILED DESCRIPTION OF THE INVENTION

Embodiment 1—Exposed Rotor

The Stator

For definitional purposes, axial movement means in a direction along the shaft, while transverse or radial means in a direction perpendicular to shaft. All O rings are considered "seal means," and are preferred to be constructed of viton.

Figure 1:
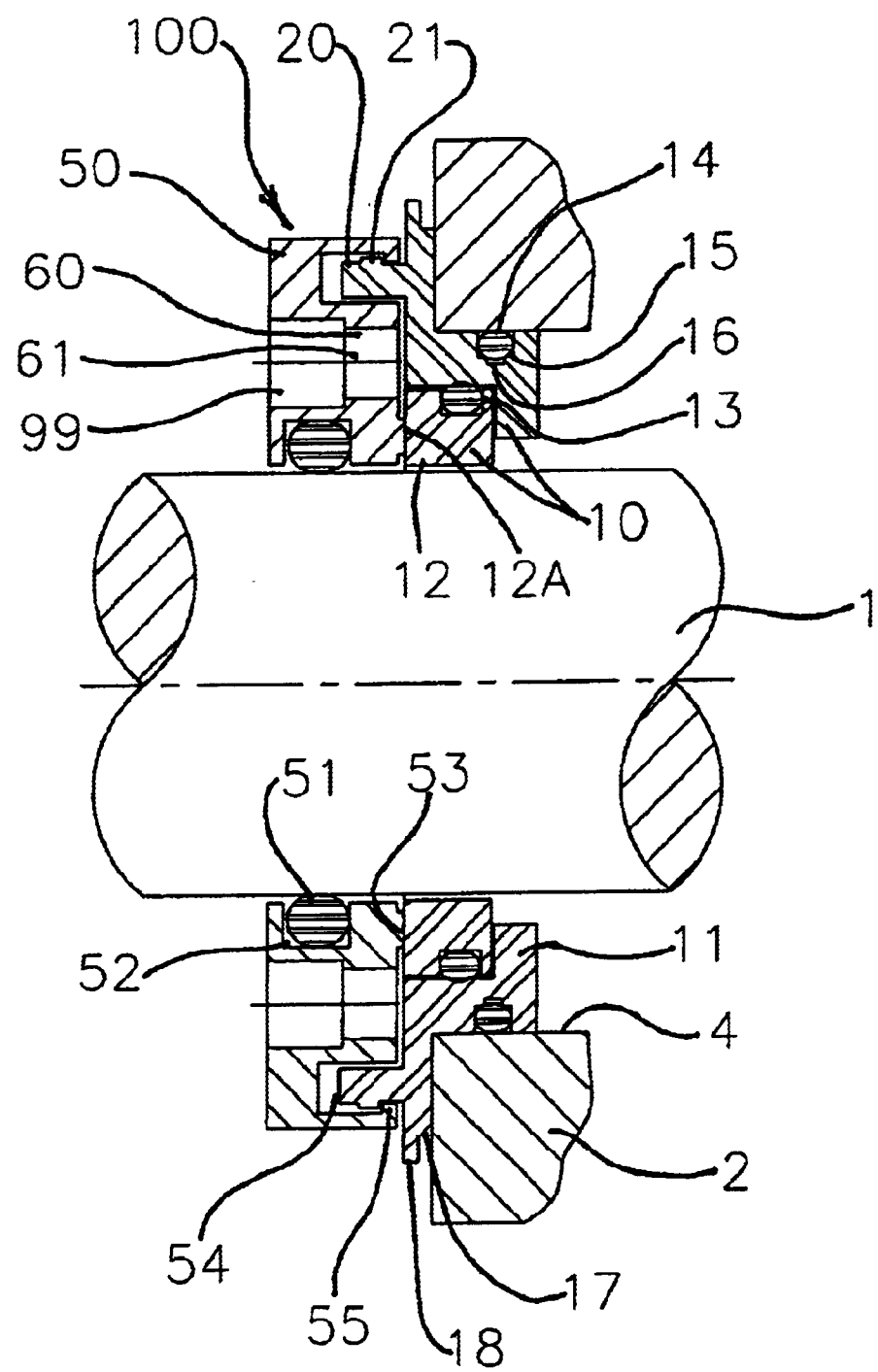
FIG. 1 shows a cross section through one embodiment of the invention, the exposed rotor version.

The invention consists of a mechanically and magnetically coupled stator 10 and rotor 50. Both stator 10 and rotor 50 are rings having bores slightly larger than the shaft to which they will be coupled. One embodiment is shown in FIG. 1. Shown is the stator 10 and rotor 50. In this embodiment, rotor 50 is positioned outside the housing 2. Rotor 50 encircles rotating shaft 1. Stator 10 is a two component piece, comprising a housing adapter 11 and a stationary face 12. Stationary face 12 and housing adapter 11 are coupled by O ring 13. In this embodiment housing adapter is 17-4PH ferro-magnetic steel, while stationary face is 17-4ph hardened heat-treated steel. Stationary face 12 may "float" with respect to housing adapter 11, as disclosed in U.S. Pat. No. 5,730,447, herein incorporated by reference.

Stationary face 12 has a contact face 12A, honed flat to very high tolerances (such as flat within 0.000023 inches). Contact face 12A may be coated, for instance with silicates, titanium oxides, chromium stellite, or titanium nitrides. Housing adapter 11 is seated in shaft housing opening 4, and retained in the shaft housing opening 4 through operation of O ring 14 set in a groove 15 in the housing adapter. Groove 15 may have a mid-line groove 16 beneath groove 15 (a "groove-in-a-groove"); groove 16 allows the O ring 14 placed in groove 15 to 'flow' or be compressed into mid-line groove 16, thus restricting the ability of O-ring to slide within groove 15, which is well known in the art;

alternatively, the groove 15 could be shaped to resist O-ring slide, such as the semicircular shape of the groove as disclosed in the U.S. Pat. No. 5,730,447 (both configurations are referred to as the "anti-slide configuration").

Housing adapter 11 has a first lip 17 and a second lip 18. When housing adapter 11 is installed, second lip 18 is butted up against the exterior of the shaft housing and first lip 17 stands off the shaft housing a distance of the thickness of the second lip 18. First lip 17 thus provides a gripping surface that can be used to assist in removal of the assembled installed seal from the shaft housing opening 4.

Housing adapter 11 also has an upstanding circumferential ring 20 extending axially with a ring flange 21 extending transversely from the ring 20. As shown, the ring flange 21 extends transversely outward, however, an inward extension would also serve the function intended for this piece, as later described.

The Rotor

Rotor 50 rotates with the shaft, and is coupled to the shaft 1 through an O-ring 51 placed in a annular groove 52. This O-ring 51 also seals the rotor 50 against the shaft 1. However, the O ring 51 diameter is slightly smaller than the width of the groove 52. A current embodiment the grove width is about 0.010 greater than the O-ring diameter, after compression of the O-ring in the groove. Rotor 50 also has rotor contact face 53 with mates with stator contact face 12A to seal the stator/rotor surfaces. This O-ring/groove 51/52 should not be the anti-slide configuration, as it is desired that the rotor 50 slide along the shaft 1 to account for wear in the contact surfaces, which occurs over time. The rotor contact surface 53 is generally composed of a composition of tetrafluoroethylene (TFE, or polytetrafluoroethylene (PTFE) or teflon) carbon graphite and ceramic material (incl.

Rotor 50 has an axially extending annular groove 54 which is substantially the complementary cross-sectional profile of the axial ring 20 and ring flange 21, but slightly enlarged (here, the profiles differ by 0.010, providing a certain amount of "play" between the annular groove 54 and the ring 20 (the free movement range of the rotor). The amount of play is predetermined, and should not be so large as to disrupt the ability of the magnets to keep the contact faces together. The complementary annular groove shape results in a flange end or shoulder 55 on the rotor annular groove 54 end, which, as later described, operates in conjunction with a flange 21 on the axial ring 20 of the stator 10. This shoulder 55 is designed to mechanically couple with the stator's axial ring 20 and flange 21 after a range of free movement of the rotor 50 is exceeded.

The seal 100 is assembled by interlocking the stator 10 and rotor 50 into a unit by interlocking the rotor annular groove 54 with the stator ring 20. This interlocking requires either flexibility in the rotor annular groove or compressibility in the ring/flange of the stator. It has been found that using a synthetic composite carbon/Teflon(PTFE)/ceramic non-magnetic material for rotor construction, suitable flexibility can be provided. One material found suitable is 700 HP, available form GSF Plastics in Houston, Tex. This material is also suitable for the rotor contact face, thereby allowing the entire rotor to be constructed in a single piece.

Rotor 50 has a series of axially extending cavities 60. Placed in these cavities are permanent magnets 61, generally of rare earth composition known in the art, such as samarium cobalt. The number and size of the magnet should be sufficient to maintain a sealing relationship between the contact faces. Placing the magnets 61 in non-magnetic materials provides the benefit of not disturbing the flux field produced by the magnets. Alternatively, a magnetic ring could be used instead of a plurality of magnets.

The magnets 61 are epoxied into the rotor. However, when using a rotor composition of synthetic material, epoxy adherence to the rotor can be problematic. To relieve this problem, epoxy channels 99 are milled in the rotor 50, extending from the cavity bottoms to the opposite face of the rotor 50, with the channels having a slight funnel shape at the end opposite the cavity. It is important that the cavity channel have a top portion of larger cross-sectional area than the opening of the channel into the cavity (the bottom of the channel). The top portion's additional breath will resist removal of the epoxy plug which will form in the channel, and retain the magnet attached to the bottom of the epoxy plug. Epoxy placed in these channels 99 will contact and adhere to the magnets 61 and thereby retain the magnet 61 in the cavity 60, resisting movement of the magnet by the "epoxy head" in the funnel end of the channel 99. A suitable epoxy is 3M-DP 190, available from 3M Corporation.

As can be seen, the stator/rotor can be assembled in the factory and shipped to the installation site as a unit 100. In this fashion, the contact faces 12A/53 are not exposed, thus protecting the faces from damage by the installer. At the site, the seal unit 100 is placed on the shaft, 1 and slid into its final position. Because the stator/rotor are sealed against the housing/shaft respectively by O-rings, the seal is relatively easy to install, and a machine press is not necessary.

Operation

The seal 100 as described allows for shaft axial movement as follows.

A. Outward Movement

If the shaft 1 moves outwardly from the housing, the rotor 50 will initially move outwardly with the shaft, but the magnets will draw the rotor back into contact with the stator. For the first (in the range of 10/1000 inch) degree of movement, the rotor easily slides along the shaft (the O-ring remains stationary on the shaft since the D-ring diameter is 10/1000 inch smaller that the width of the groove). If the shaft movement exceeds the clearance between O-ring 51 and annular groove width 52, (generally greater that 0.01 inch), the O-ring 51 will contact the groove 52 sidewalls, and the rotor will again axially on the slide provided the O-ring slides in the groove 52.

A magnetic closing force of about 3–4 psi has been found sufficient overcome the O-ring frictional forces to slide rotor axially on the shaft. However, for reasons to be described, a closing force (at face contact) of 9–11 psi is preferred. The larger closing force is preferred for the following reason. Once the seal is placed on the shaft, the O-ring 51 is exposed to heat and may stick to the motor shaft. If the O-ring adheres to the shaft, the O-ring, upon being brought into contact with the groove 52 sidewall through sufficient shaft movement, will not slide. When this occurs, the Rotor ceased to follow or mimic the shaft outward axial movement, resulting in a gap opening between the contact faces. Further outward shaft movement in excess of 0.01 inch will cause the "play" between the rotor and stator to be taken up or removed, whereby the rotor groove/shoulder contacts the flange of upstanding ring. Upon contact, the rotor is now mechanically coupled to the stator and cannot move further outward, and as a result, the adhered O-ring will be freed, allowing it to rotor to again slide on the shaft. However, now the rotor is separated from the stator by 0.01 inch, with a resulting reduction in magnetic closing forces. With the current design, this 0.01 inch gap should reduce the closing forces to about 60% of that of present when the contact faces are touching, or a reduction from about 10 psi to a closing force of about 4 psi. As indicated above, a 4 psi force is sufficient to draw the contact faces together and thereby mechanically decoupling the stator ring/flange from the rotor groove/shoulder.

The present arrangement allows the rotor to slide on the shaft and generally maintain a seal. And even when the O-ring adheres, the present arrangement is designed to free the adhered O-ring (with sufficient shaft movement) through a mechanical coupling of the stator/rotor, thereby reducing the frictional forces and so that the magnetic closing force is sufficient to magnetically couple (as distinguished from the mechanical coupling of the ring/annular groove geometry) and bring together the contact faces.

The stator stationary face 12 will slide axially across the housing adapter 11 under operation of the magnets. With sufficient shaft movement, the annular groove flange end 55 will contact the axial ring flange 21. At this point, the stator/rotor are mechanically coupled into a unit. Further outward movement of the shaft will result one of two possibilities: (a) the coupled unit will move axially with the shaft; or (b) the rotor 50 will slide on the shaft 1 while the housing adapter 11 remains stationary in the housing. Because the frictional forces maintaining the stator 10 in the housing are greater that the frictional forces maintaining the rotor 50 on the shaft (due to the larger "O" ring surface area on the stator housing O ring and the anti-slide configuration of this O ring), the result is that the rotor 50 slides along the shaft axis with the housing adapter 11 remaining stationary.

B. Inward Movement

If the shaft moves inwardly, the stator and rotor are mechanically coupled through contact between the rotor and stator contact faces, and the rotor must slide on the shaft, even if the rotor O-ring is adhered to the shaft. When the O-ring adheres to the shaft, the inward shaft movement, if sufficient, will free the O-ring though a shearing force.

In both cases, (shaft inward movement, shaft inward movement), the contact faces generally remain a sealing surface, and the O-rings about the housing and shaft continue to seal. In outward movement with an adhered O-ring, a seal may be lost for a short time either until the shaft returns inward, or until further outer movement of the shaft breaks the O-ring loose. In most operational cases, shaft axial movement will be transient, and any loss of seal should result in little or no fluid loss across the contact faces, particularly in a splash type environment. Additionally, the annular groove and interlocking ring/flange provide an additional feature. The geometry of these features results in a labyrinth, providing additional protection to the contact surfaces from contaminants.

As envisioned, the exposed rotor seal is thought to be best for a splash or mist compartment application, as opposed to a flooded application. As can be seen, in a flooded environment, outward hydraulic pressure will be placed on the contact faces, tending to separate the contact faces.

The geometry of the rotor/stator thus provides a means for coupling the stator and rotor, and the difference in the frictional forces maintaining the stator and rotor provides a means to allow the rotor to move with the stator remaining fixed. It is also possible to for the stator to remain fixed simply with a press fit of the housing adapter to the housing or using suitable housing and housing adapter geometry. However, in these cases, the overall seal will be more difficult to install.

Embodiment 2—Exposed Stator

The Stator

Figure 2:
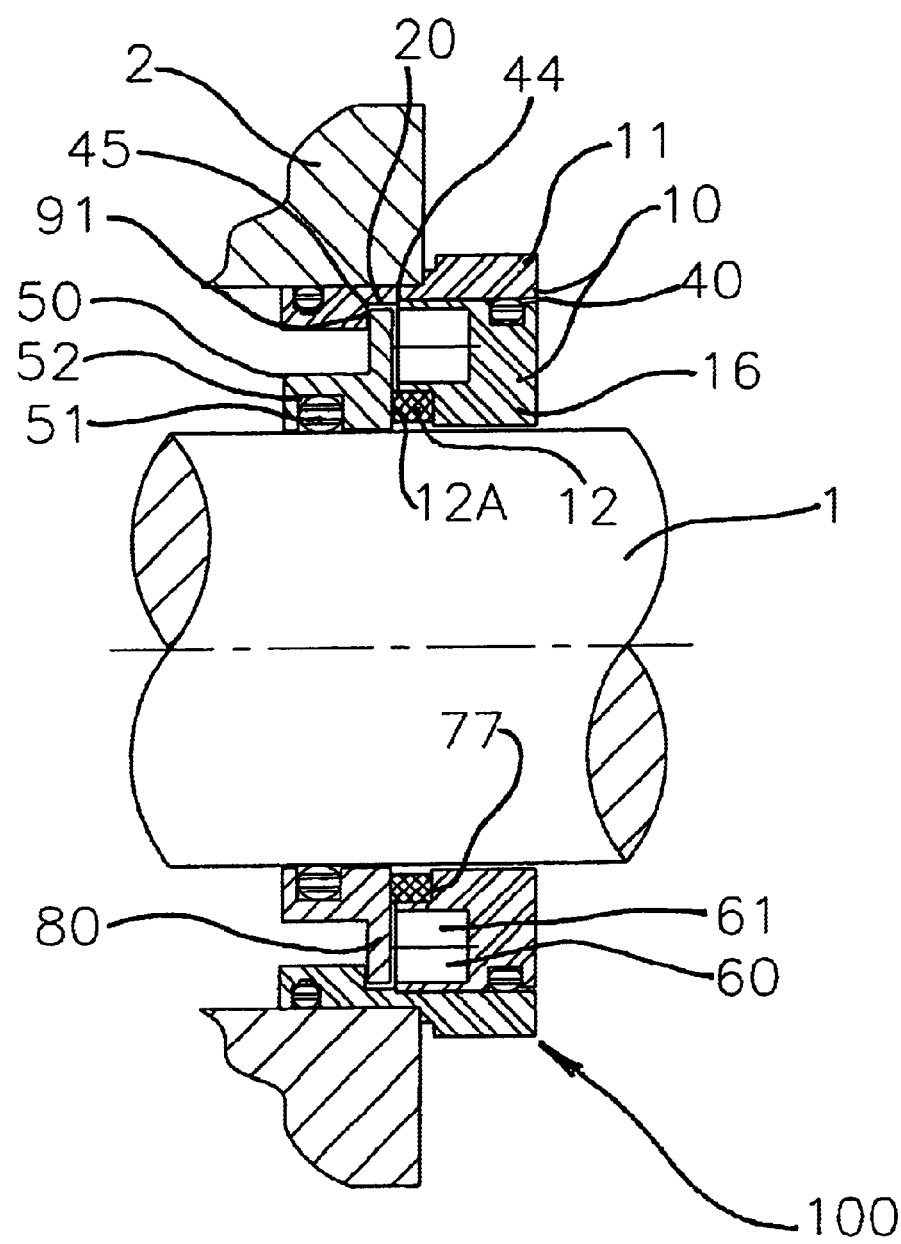
FIG. 2 shows a cross section through another embodiment of the invention, the exposed stator.

FIG. 2 shows another embodiment, one having the rotor 50 in the shaft housing 2 while the stator 10 is exposed. As before, the stator 10 is a multi-piece component. As shown in FIG. 2, the stator 10 is a three-piece component, a stationary face 12, a stationary face adapter 16 and a housing adapter 11. As shown, the stationary face adapter 16 and housing adapter 12 are coupled through an O ring. Upon assembly, an adhesive, such as lock-tite, may be placed in the circumferential area of the housing adapter 11 and stationary face adapter 16 joint in the region 40 between the O ring and the external surface. Additionally, the housing adapter inner bore contains two cascading flanges; a first flange area 44 upon which the stationary face adapter 16 abuts; and a second flange area 45, which creates a annular groove 20 when the housing adapter 11 and stationary face adapter 16 are assembled. This annular groove 20 has a sidewall 91 which acts as an interlocking shoulder which will interlock with a flange 80 on the rotor 50, later described. In some instances, it may be desired to fixedly join the stationary face adapter 16 to the housing adapter 11, such as by roll crimping the joint 69 between these components (see FIG. 3).

The housing adapter 11 is coupled to the housing 2 through an anti-slide O ring configuration, previously described. As the stator 10 is now the exposed component, the housing adapter 11 now has the double lipped outer wall (lip 51 and lip 52), providing the suitable standoff flange for ease of removal of an installed seal. This double lip arrangement is not required for operation of the seal. A plurality of magnets 61 is placed in cavities 60 in the stationary face adapter 16. Again, the magnets 61 are epoxied into the cavities 60 in the stationary face adapter 16, and epoxy channels 99 may be used. In the exposed stator configuration, a preferred material for the housing adapter 11 and stationary face adapter 16 is a bronze, a non-magnetic material. When using a bronze stationary face adapter, the magnets may be pressed fit into the cavities without epoxy.

The stationary face 12 is now a separate annular ring, positioned on a shaft-facing circumferential flange 77 on the stationary face adapter 16. One side of the stationary face 12 contains the stator contact face 12A, and the entire stationary face is composed of a synthetic slidable heat resistant composite material, such as a composite of tetrafluoroethylene (TFE) carbon graphite material and ceramic, or teflon/glass filled ceramic.

The stationary face 12 is fixed to the stationary face adapter 16 with epoxy. To assist the hold strength of the epoxy, the portion of the stationary face 12, which will contact the stationary face adapter 16 can be etched to create more surface area.

Other suitable composite materials are known in the art.

The Rotor

The rotor 50 is an annular ring and is coupled to the shaft 1 through an O-ring 51. Positioned in annular groove 52. It is not desired to use the anti-slide O ring/groove configuration. As in the exposed rotor configuration, the O-ring is approximately 10/1000 inch smaller (after compression in the groove) than the annular groove in which it is positioned.

The rotor 50 has a circumferential transverse flange 80, which when the rotor 50 is assembled with the stator 10, rides in a annular groove 90 formed between the stationary face adapter 16 and the housing adapter 11. The combined unit 100 is designed to have a certain degree of space or "play" between the rotor flange 80 and the housing adapter 11. Rotor 50 has a contact face 53 that slides on and creates a sliding seal with stator contact face 12A.

As can be seen, the circumferential transverse flange 80 allows the rotor 10 and stator 50 to be combined into a unit at the factory and shipped assembled, thus protecting the contact faces from damage. The rotor 50 is composed of 17-4ph ferromagnetic stainless steel.

Operation

When the stator 10 and rotor 50 are assembled and installed, an interlocked seal 100 (interlocked stator and rotor) is again created allowing unlimited shaft movement. For instance, as the shaft 1 moves outward axially, the rotor 50 will slide on the shaft 1 while the stator 50 remains stationary with respect to the housing 2. The frictional forces holding the stator housing adapter 11 to the housing 2 and the frictional forces holding the stationary face adapter 16 to the housing adapter 11 are greater than those holding the rotor 50 to the shaft 1. For outward movement, the rotor will slide on the shaft maintaining contact between the rotor/stator contact faces. If the O ring adheres to the shaft, the rotor is forced to follow the shaft, and the O-ring will be freed by shearing forces.

For inward axial shaft movement less than about 0.010 inches, the rotor 50 and stator contact faces will remain in contact, as the rotor will axially slide on the shaft throught the magnetic forces. For shaft movement in excess of about 0.010 inch, maintenance of the contact or seal between the contact faces will depend upon the ability of the O-ring to slide. If the O-ring is free to slide, the magnets create sufficient closing forces to overcome the O-ring frictional forces and will continue to draw the rotor toward the stator, thereby maintaining contact and seal between the stator/rotor contact faces. If the O-ring adheres to the shaft, shaft inward movement beyond 0.010 inches will result in the gap opening between the contact faces. Further inward shaft movement in excess of the 0.01 inch "play" will then cause the rotor flange to contacts groove sidewall, creating a shearing force on the stock O-ring, freeing the O-ring allowing the rotor to further axially slide on the shaft, thus allowing the magnets to draw the rotor contact face into contact and seal with the stator contact face.

In normal operational circumstances, such a shaft movement is usually transitory and of short duration, and hence the loss of seal for a short period of time (until the O-ring is free to slide) is usually tolerable.

Figure 3:
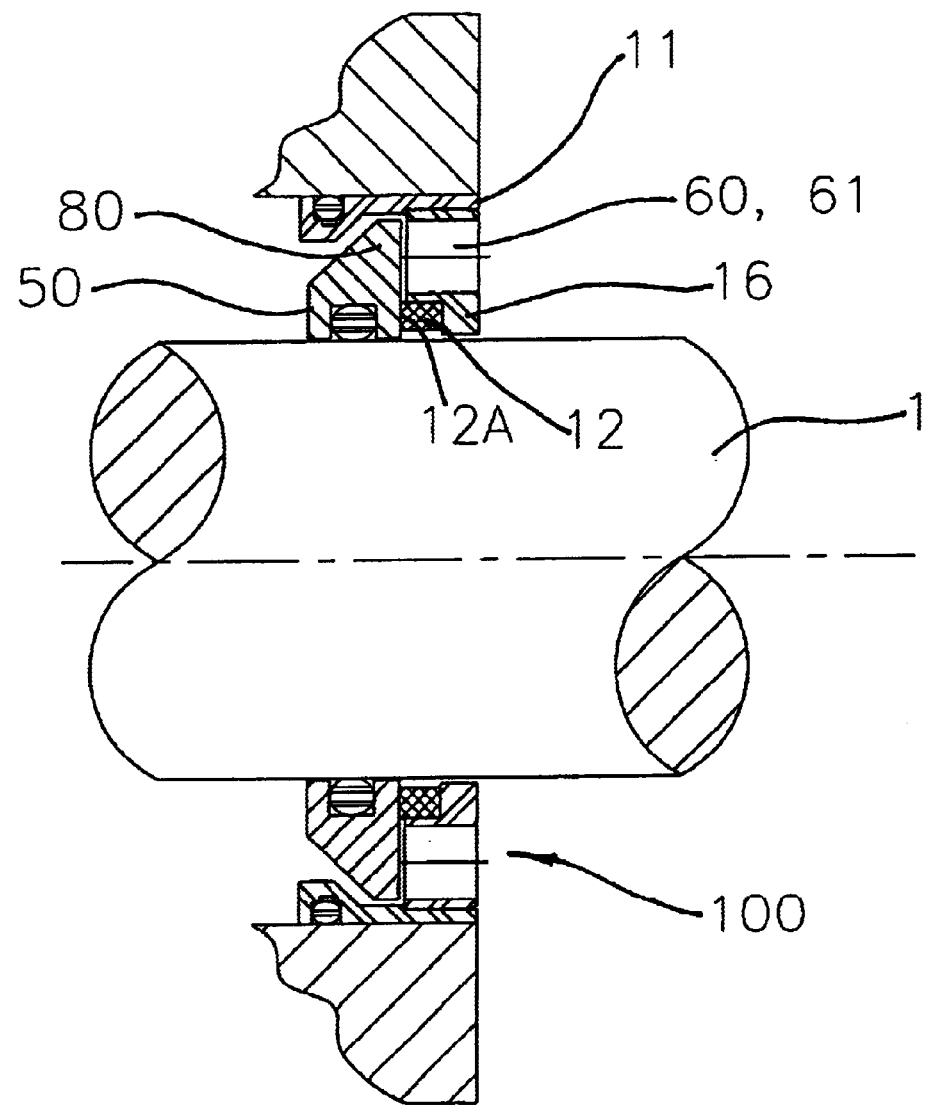
FIG. 3 shows a cross section through other embodiments of the exposed stator version of the invention.

The exposed stator seal is suitable for a flooded, mist or splash environment. In a flooded environment, hydraulic pressure on the rotor face will simply apply compression pressure on the contact faces, assisting the sealing function. Other configurations of the exposed stator seal are shown in FIG. 3. The numbers identify similar components. As can be seen from FIG. 3, the "flange" on the rotor 50 is a thickening of the rotor 50 in a transverse direction. When used herein, "flange" should be interpreted to include such a thickening. As is readily apparent, the stator 10 and rotor 50 are mechanically coupled through the geometry of these components. In the exposed rotor embodiment, the rotor has the annular groove while the stator has the coupling flange. In the exposed stator embodiment, the stator has the annular groove while the rotor has the flange. Obviously, the placement of annular groove/flange on the stator/rotor can be interchanged in either embodiment. Additionally, other interlocking features or geometries can be used to produce the desired coupling.

The ability to account for axial shaft movement is a benefit in an operational mode and in a maintenance mode. Obviously, allowance for shaft movement while maintaining a seal against the shaft is beneficial. The present seals, however, can remain in place and perform a sealing function if the motor needs to be removed from service and the shaft pulled to perform maintenance.

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

We claim:

1. A device for sealing a rotatable shaft and a fixed housing, said device comprising an annular stator and an annular rotor, said stator having a seal means far forming a seal with said housing, said rotor having a seal means for forming a seal with said shaft, said rotor and said stator each having contact faces, said device having a means for mechanically coupling said rotor to said stator and for permitting said rotor to move axially independently of said stator within a predetermined range of separation between said rotor and said stator within said mechanical coupling, and at least one magnet urging said rotor contact face to re-engage said stator contact face during said separation; and wherein said predetermined range of separation results in a magnetic re-engagement force no less than forty percent (40%) of the magnetic attractive force existing between said rotor and said stator when said faces are engaged.

2. A device for sealing a rotatable shaft and a fixed housing, said device comprising an annular stator and an annular rotor, said stator having a seal means for forming a seal with said housing, said rotor having a seal means for forming a seal with said shaft, said rotor and said stator each having contact faces, said device having a means for mechanically coupling said stator and said rotor and for permitting said rotor to axially slide along said shaft within a predetermined range of separation between said rotor and said stator within said mechanical coupling, and at least one magnet urging said rotor contact face to re-engage said stator contact face during said axial sliding of said rotor; and wherein a magnetic re-engagement force exists between said stator and said rotor which is no less than forty percent (40%) of the magnetic attractive force existing between said rotor and said stator when said faces are engaged.

3. The device according to claim 1 where said means for mechanically coupling includes an interlocking flange and annular groove, said flange positioned on one of said rotor or said stator, said annular groove positioned on the other of said rotor or said stator.

4. The device according to claim 3 where said annular groove is positioned on said stator and said flange is positioned on said rotor.

5. The device according to claim 3 where said annular groove is positioned on said rotor and said flange is positioned on said stator.

6. A device for sealing a rotatable shaft and a fixed housing, said device comprising an annular stator and an annular rotor, said stator having a seal means for forming a seal with said housing, said rotor having a seal means for forming a seal with said shaft, said rotor and said stator each having contact faces, said device having an annular groove positioned on one of said stator or said rotor, and a flange positioned on the other of said stator or said rotor, wherein said annular groove and said flange are engaged with one another to mechanically couple said rotor to said stator, and wherein said engagement establishes a predetermined distance within which said rotor may move axially independently of said stator, and at least one magnet urging said rotor contact face to re-engage said stator contact face during movement of said rotor; and wherein said predetermined distance results in a magnetic re-engagement force no less than forty percent (40%) of the magnetic attractive force existing between said rotor and said stator when said faces are engaged.

7. A device according to claim 1 having a plurality of magnets.

8. A device according to claim 3 wherein said flange and said annular groove have substantially complementary cross-sectional profiles.

9. The device according claim 2, wherein said rotor slides along said shaft to accommodate unlimited axial shaft movement within said rotor.

10. The device according to claim 1, wherein said rotor is constructed substantially of a semi-flexible heat-resistant material.

11. The device according to claim 2, wherein said rotor is constructed substantially of a semi-flexible heat-resistant material.

12. The device according to claim 1, wherein said means for mechanically coupling said rotor to said stator forms a labyrinth.

13. The device according to claim 2, wherein said means for mechanically coupling said rotor to said stator forms a labyrinth.

* * * * *